United States Patent Office 2,780,312
Patented Feb. 5, 1957

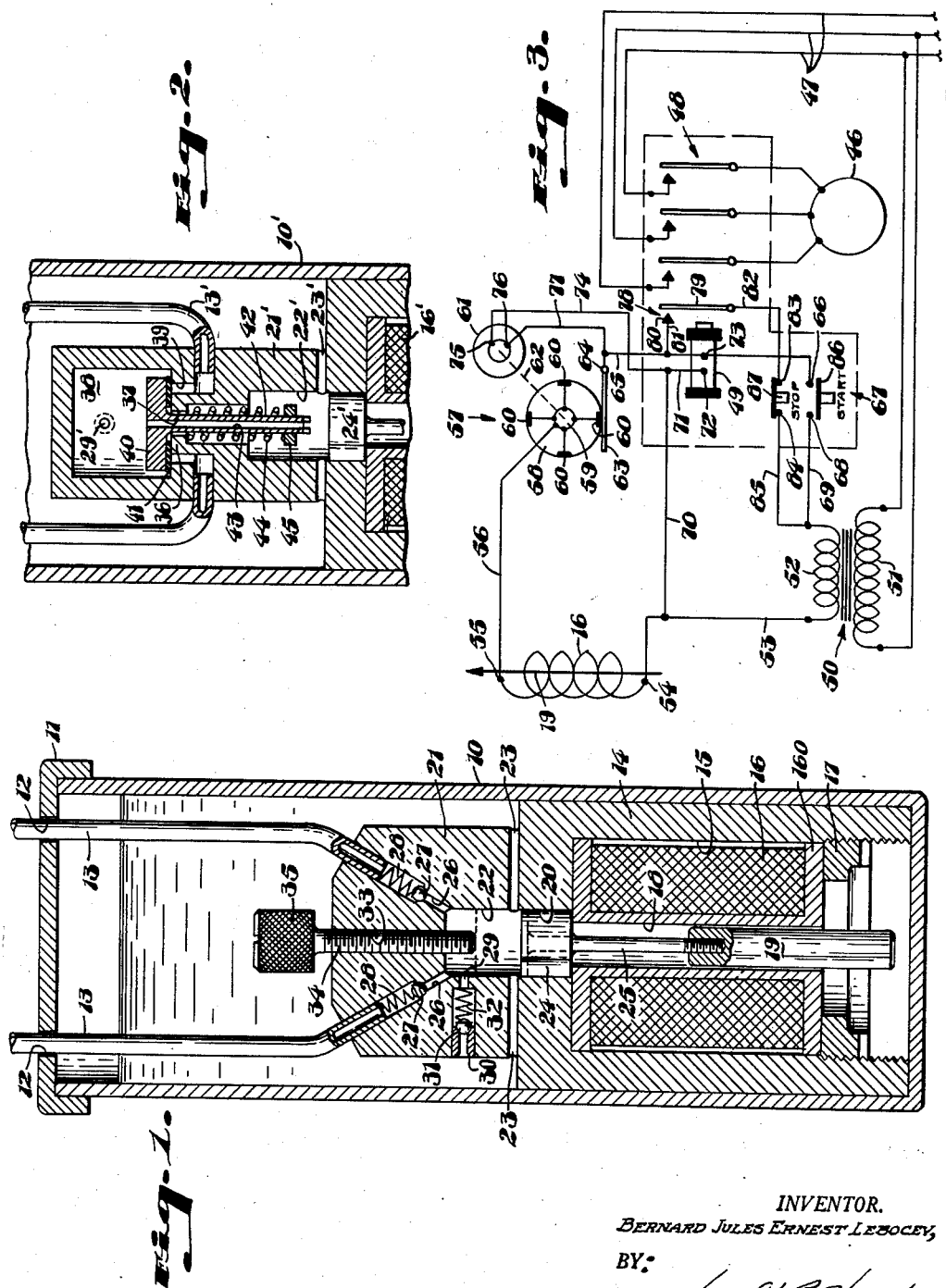

2,780,312
ELECTRO-MECHANICAL LUBRICANT DISTRIBUTOR

Bernard Jules Ernest Lebocey, Troyes, France, assignor to Daniel I. Glossbrenner, Indianapolis, Ind.

Application July 23, 1954, Serial No. 445,393

Claims priority, application France November 30, 1953

7 Claims. (Cl. 184—26)

The present invention relates to an electro-mechanical lubricant distributor, and more particularly to an automatic, impulse type lubricating system, especially applicable to circular and rectilinear knitting machines.

A primary object of the invention is to provide a system which, during operation of a machine with which it is associated, will intermittently deliver, at predetermined intervals in the machine cycle, measured quantities of lubricant to selected points in the machine, but which will automatically be thrown out of operation whenever the machine is stopped.

A further object of the invention is to provide an improved control for an impulse type, electrically actuated lubricant pump, through which the above-described operation will be attained.

A further object of the invention is to provide a novel and simple form of self contained, impulse type lubricant pump.

Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a somewhat diagrammatic vertical section through a pump constructed in accordance with my invention;

Fig. 2 is a fragmental similar section through a modified form of pump; and

Fig. 3 is a wiring diagram illustrating my improved control for a pump of the character illustrated in Fig. 1 or of the character illustrated in Fig. 2.

Referring more particularly to the form of pump illustrated in Fig. 1, it will be seen that I have shown a reservoir 10 in the form of an open-topped cylinder, adapted to be closed by a cover 11 suitably perforated as at 12 for the passage of one or more delivery tubes 13. Advantageously, the container 10 may be made of glass or translucent synthetic material so that it may be graduated to provide an indication of the quantity of lubricant currently contained within the reservoir.

A block 14 snugly fits in the bottom of the reservoir 10, and is formed with a cavity 15 in which is received a solenoid 16 which may preferably be encased in a protective shell 160, and which is held in place in the cavity 15 by a ring nut 17, or the like. The solenoid coil is formed to provide a central chamber 18 in which is reciprocably mounted the ferrous core 19.

The block 14 is formed with a socket 20, concentric with the solenoid, and communicating, in concentric alignment, with a pump chamber 22 formed in a pump body 21 which may be integral with, or separate from, the block 14. A suitable number of passages 23 provide open communication between the interior of the reservoir 10 and the interior of the pump chamber 22, said passages opening radially into the pump chamber at a level just above the retracted position of a piston 24 whose stem 25 is fixedly secured to the solenoid core 19.

One or more outlet ports 26 open through that end of the pump chamber 22 remote from the passages 23; and each such port is guarded by a check valve preferably in the form of a ball 27 backed by a spring 28, each such check valve being arranged to permit flow through its port 26 away from the chamber 22, but to prevent flow therethrough toward said chamber.

Preferably, the entire assemblage will be arranged upon a substantially vertical axis, so that the piston 24 is gravity-urged toward its retracted position. Preferably, a further passage 29 will be formed in the body 21, communicating at one end with the upper portion of the pump chamber 22 and at its opposite end with the interior of the reservoir 10. A check valve, preferably comprising a ball 31 coacting with a seat 30 in the outer end of the passage 29, under the influence of a spring 32, is arranged to prevent flow through the passage 29 away from the chamber 22, but to permit flow therethrough toward said chamber.

A threaded bore 33 extends from the upper end of the pump body 21 into the chamber 22; and a stop screw 34, preferably having a knurled head 35, is adjustably mounted in said bore.

It will be obvious that, when the parts are at rest, in the positions illustrated in Fig. 1, liquid from the reservoir will flow through the passages 23 to fill the pump chamber 22. Upon energization of the solenoid coil 16, the core 19 will be raised, carrying the piston 24. As the piston moves upwardly in the chamber 22, it will promptly close the inner ends of the passages 23; and further upward movement of said piston will force liquid past the valves 27 and through the conduits 13 to the selected points of delivery. The volume of lubricant delivered, upon each such upward movement of the piston 24, will be determined by the current position of adjustment of the screw 34 which, being disposed in the path of the piston 24, will limit the upward movement thereof.

Upon deenergization of the coil 16, the piston 24 and core 19 will drop, by gravity (assisted, if desired, by a spring, not shown) to their illustrated position. The valves 27, of course, will prevent return flow of lubricant from the conduits 13 to the chamber 22. The downward movement of the piston 24 will tend to reduce the pressure in the chamber 22; and liquid will flow, during such downward movement, past the valve 31 into the chamber 22. When the piston reaches its illustrated position, the passages 23 will again be open, so that the filling of the chamber may be completed through said passages.

In Fig. 2 I have illustrated a modified form of pump. In this form, the pump body 21' is formed to provide a pump chamber 22' whose upper end is defined by a web 36 formed with a perforation 37 communicating with an auxiliary chamber 38 in the pump body. One or more ports 39, opening through the floor of the chamber 38, lead to corresponding pipes or conduits 13'.

A valve 40, with which is preferably associated a gasket 41, is provided with a stem 42 which is loosely mounted for reciprocation in the perforation 37 of the web 36. A bore 43 extends axially through the valve 40 and the stem 42, thus providing open communication between the chambers 22' and 38. A spring 44 cooperates with an abutment 45 on the stem 42 to hold the valve resiliently in its illustrated position in which the gasket 41 closes the ports 39. A valved passage 29', in all respects similar to the passage 29, preferably opens into the upper end of the chamber 38.

In this form of the invention, and with the parts in their illustrated positions, liquid from the reservoir 10' will flow through passages 23' to fill the chamber 22', and, through the bore 43, to fill the auxiliary chamber 38. When the solenoid coil 16' is energized, the piston 24' will be raised, sealing the passages 23' and forcing liquid from the chamber 22' through the passage 43 toward the auxiliary chamber 38. Liquid will also flow, around the stem 42, through the perforation 37 to maintain substantial equality of pressure on opposite sides of the valve head 40. After a short movement, the piston 24' will engage the stem 42 to lift the valve 40, thereby opening the ports 39 through which liquid lubricant will flow from the auxiliary chamber 38 through the conduits 13' to appropriate points of delivery.

Upon deenergization of the coil 16', the piston 24 will drop and the spring 44 will return the valve 40 to port-closing position, thereby preventing return flow of liquid through the conduits 13'. As the valve 40 drops, thus tending to evacuate the auxiliary chamber 38, liquid will flow into said chamber through the passage 29'. As the piston attains its illustrated position, the passages 23' will be opened, and lubricant will flow through said passages to complete the filling of the chambers 22' and 38.

As indicated above, it is an object of the present invention to provide automatic control means for such a pump, operating, so long as the machine with which it is associated is in operation, to supply measured quantities of lubricant, automatically at predetermined intervals, to points which require such lubrication. The invention finds primary utility in, for instance, a knitting machine where the beds and the cam races, for instance, require such intermittent lubrication. It is important, however, in such a machine, that the intermittent delivery of lubricant shall not be continued at times when the machine is not in operation; and, in Fig. 3, I have diagrammatically illustrated such a control system.

In that illustration, a motor for driving the machine is indicated at 46, said motor being energized through a suitable circuit indicated at 47, and a multiple-pole switch 48 dominated by an electro-magnetic uncoupler 49. Conventionally, the arrangement is such that the poles of the switch 48 are biased to circuit-open position, but will be swung to, and held in, circuit closing position by energization of the uncoupler 49.

I have illustrated a transformer 50 whose primary coil 51 is energized from a suitable source. From one end of the secondary coil 52 of the transformer 50, a line 53 leads to one end 54 of the solenoid coil 16 or 16' of a pump such as those illustrated in Figs. 1 and 2. From the other end 55 of the coil 16, a line 56 extends to a collector ring or common or central contact 59 carried upon a rotor 58. The rotor 58 may be a disc of dielectric material carrying upon its periphery any suitable number of contact points 60, electrically separated from each other but all electrically connected to the common contact 59. In the illustrated system, a micro motor 61 is suitably arranged to drive the rotor 58, a shaft or spindle 62 being suggested in the diagram. A contact finger 63 is suitably arranged to wipe the contact points 60 successively as the rotor 58 turns. Preferably, the finger 63 will be hinged at 64 and will be resiliently urged into contact with the periphery of the rotor 58.

A wire 65 connects the contact finger 63 with one terminal 66 of a normally-open starting switch 67, the other terminal 68 of said switch being connected by a wire 69 with the other end of the transformer secondary coil 52.

A wire 70 leads from the wire 53 to a wire 71 which is connected to one terminal 72 of the uncoupler 49, the other terminal 73 thereof being connected by the wire 65 to the terminal 66 of the switch 67.

A wire 74 leads from the wire 70 to one terminal 75 of the motor 61, and the other terminal 76 of said motor is connected, by wire 77, with the wire 65.

Thus, when the starting switch 67 is closed, an energizing circuit for the uncoupler 49 will be established from coil 52 through wire 53, wire 70, wire 71, terminal 72, uncoupler 49, terminal 73, wire 65, terminal 66, bridge piece 86 of switch 67, terminal 68 and wire 69 to coil 52.

At the same time, the motor 61 will be energized through a circuit leading from transformer coil 52 through wire 53, wire 70, wire 74, terminal 75, terminal 76, wire 77, wire 65, switch 67 and wire 69.

According to the present invention, a holding switch 78 is built into the system, said switch being dominated by the uncoupler 49 and comprising a movable arm 79 adapted, when the unit 49 is energized, to engage a contact 80. Said contact 80 is connected, by wire 81, with wire 65; and the arm 79 is connected, by wire 82, to one terminal 83 of the normally closed stop switch 87 whose other terminal 84 is connected, by wire 85, with the transformer coil 52.

Thus, when the start switch 67 is closed to energize the uncoupler 49, the arm 79 is immediately attracted into engagement with the contact 80, thereby establishing a holding circuit for the uncoupler 49 which may be traced from transformer 52 through wire 53, wire 70, wire 71, terminal 72, uncoupler 49, terminal 73, wire 65, wire 81, contact 80, arm 79, wire 82, terminal 83, bridge piece 87, terminal 84 and wire 85 to coil 52. The same switch establishes, also, a holding circuit for energizing the motor 61 leading from coil 52 through wire 53, wire 70, wire 74, terminal 75, terminal 76, wire 77, wire 65, wire 81, contact 80, arm 79, wire 82, switch 87 and wire 85 to the coil 52.

As the motor 61 drives the rotor 58, a contact point 60 will be brought into electrical contact with the arm 63 to establish an energizing circuit for the solenoid coil 16 which may be traced from transformer 52 through wire 53, terminal 54, coil 16, terminal 55, wire 56, common contact 59, contact point 60, contact arm 63, wire 65, wire 81, contact 80, switch arm 79, wire 82, switch 87 and wire 85 back to transformer coil 52.

Upon energization of the coil 16, the core 19 will be raised to actuate the piston 24 to deliver lubricant to selected points of the machine, as above described.

However, continued rotation of the rotor 58 will, of course, move the contact point 60 out of engagement with the arm 63, thus breaking the energizing circuit for the coil 16 and permitting the piston 24 to drop to its illustrated position. As the rotor 58 continues to turn, the next successive contact point 60 will engage, and then leave, the arm 63 to repeat the pumping cycle; and this operation will continue for so long as the switch 78 and the switch 87 remain closed. The frequency and the rhythm of the pumping cycle can, of course, be determined by the spacing of the contact points 60 about the periphery of the rotor 58 and by varying the rate of operation of the motor 61.

As will be understood by those skilled in the art, knitting machines are conventionally provided with safety controls of various kinds, such controls being actuated, in response to various kinds of failures in the machine, to deenergize the uncoupler 49. Such deenergization of said uncoupler, of course, will result in separation of the arm 79 from the contact 80 of the switch 78; and it will be immediately apparent that this will result in opening the energizing circuit for the motor 61 to stop the rotor 58, thereby, preventing actuation of the piston 24 at any time when the motor 48 is deenergized. It will also be apparent that, since the energizing circuit for the coil 16 likewise includes the switch 78, the coil 16 will be promptly deenergized upon opening of the switch 78, even if the rotor 58 happens to stop with a contact point 60 in engagement with the contact finger 63. Of course, since the energizing circuit for the uncoupler 49 extends, also, through the stop switch 87, the same result can be achieved by manual opening of said stop switch.

While I presently prefer the illustrated arrangement in which the rotor 58 is driven by an independent motor 61, it will be apparent that many of the advantages of the present invention can be attained in a system in which the rotor 58 is mechanically driven, at a predetermined ratio, from some rotating part of the machine which is driven by the motor 46.

It is the universal practice, in all tubular knitting machines with which I am familiar, to distribute lubricant to the points of the machine requiring lubrication, from a reservoir mounted at an elevation above all of such points, whereby a constant "head" is maintained by gravity at all such points. This arrangement, of course, makes it necessary to seal all such lubricated points against lubricant flow therefrom; and, when leakage occurs, as it inevitably will, at the reservoir or at any point above the level of the needle beds, there arises the possibility of damage to the goods being produced, by oil spotting. According to the present invention, of course, the reservoir may be located at any desired level, preferably below the path of the goods being produced, or at any desired distance away from the path of the goods, since the lubricant is positively forced through the lines 13 to the points to be lubricated.

I claim as my invention:

1. In a device of the class described, a liquid reservoir, a pump body received in said reservoir and formed to provide a pump chamber and an auxiliary chamber separated from said pump chamber by a perforated web, said body further being formed with a passage normally providing open communication between the interiors of said reservoir and of said pump chamber, and said pump body further being formed to provide an outlet port opening through the floor of said auxiliary chamber, a piston mounted for reciprocation in said pump chamber and normally occupying a position remote from said web, a valve mounted for reciprocation in said auxiliary chamber and having a tubular stem penetrating the perforation in said web and having its distal end disposed in the path of said piston, spring means cooperating with said valve to hold the same resiliently in closing relation to said outlet port, and an electric motor comprising an electromagnetic coil and a core reciprocable therein, said core being operatively connected to said piston to shift the same, upon energization of said coil, toward said web.

2. The device of claim 1 in which said pump body is formed to provide a further passage providing communication between the interior of said reservoir and the interior of said auxiliary chamber, and valve means preventing flow through said further passage away from said auxiliary chamber but permitting flow therethrough toward said auxiliary chamber.

3. A lubricating system for a machine including a motor for driving such a machine, comprising an impulse-type pump connected to deliver lubricant from a reservoir to a selected point in such a machine, said pump including a fluid impeller, a solenoid including a coil for actuating said impeller, an energizing circuit for such machine-driving motor, a switch in said circuit, electro-magnetic means for holding said switch in circuit-closing position, a source of electrical energy, a first energizing circuit for said electro-magnetic means leading from one side of said source through a normally-open switch and said electro-magnetic means to the other side of said source, a holding switch dominated by said electro-magnetic means, a holding energizing circuit for said electro-magnetic means leading from one side of said source through a normally-closed switch, through said holding switch, and through said electro-magnetic means to the other side of said source, an intermittent on-off switch comprising a rotor including a common contact, a plurality of contact points spaced about the periphery of said rotor and electrically connected to said common contact, and a contact finger arranged to wipe said contact points successively, means for driving said rotor, and an energizing circuit for said solenoid coil comprising means connecting one side of said source with one end of said coil, means connecting the other end of said coil with said common contact, and means connecting said contact finger, through said holding switch and through said normally-closed switch, with the other side of said source.

4. The system of claim 3 including means by-passing said holding switch and connecting said contact finger, through said normally-open switch, with said other side of said source.

5. The system of claim 3 in which said means for driving said rotor in an electric motor, and an energizing circuit for said last-named motor comprising means connecting one side of said source with one terminal of said motor, and means connecting the other terminal of said motor, through said holding switch and said normally-closed switch, with the other side of said source.

6. The system of claim 5 including means by-passing said holding switch and connecting said other terminal of said motor, through said normally-open switch, with said motor.

7. In a device of the class described, a liquid reservoir, a pump body received in said reservoir and formed to provide a pump chamber, said body further being formed with a passage normally providing open communication between the interiors of said reservoir and of said chamber, and said pump body further being formed to provide an outlet port communicating with said chamber at a point axially remote from said passage, a piston mounted for substantially vertical reciprocation in said chamber and normally occupying a position more remote from said port than is said passage, valve means preventing flow through said port toward said chamber but permitting flow therethrough away from said chamber, said pump body being formed with a further passage, located between said port and said first-named passage, providing communication between the interior of said reservoir and the interior of said chamber near the upper end thereof, valve means preventing flow through said further passage away from said chamber but permitting flow therethrough toward said chamber, and an electric motor comprising an electro-magnetic coil and a core reciprocable therein, said core being operatively connected to said piston to shift the same, upon energization of said coil, toward said port.

References Cited in the file of this patent

UNITED STATES PATENTS

| 1,202,895 | Rogers | Oct. 31, 1916 |
| 1,769,258 | Goodrich | July 1, 1930 |
| 1,945,596 | Chryst | Feb. 6, 1934 |
| 2,183,986 | Corey | Dec. 19, 1939 |

FOREIGN PATENTS

| 375,291 | Great Britain | June 21, 1932 |